Patented May 14, 1940

2,201,034

UNITED STATES PATENT OFFICE 2,201,034

RUBBER HYDROCHLORIDE COMPOSITION

Erich Gebauer-Fuelnegg, deceased, late of Evanston, Ill., by Marie Gebauer-Fuelnegg, administratrix, Evanston, Ill., and Eugene W. Moffett, Chicago, Ill., assignors to Marbon Corporation, Chicago, Ill., a corporation of Delaware No Drawing. Application December 10, 1936, Serial No. 115,263

16 Claims. (Cl. 91—68)

This application is a continuation in part of our copending application, Ser. No. 708,429, filed January 26, 1934.

This invention relates to compositions suitable for molding, coating and casting, and to articles of manufacture made therefrom including thin, flexible, transparent sheet material produced from a rubber hydrochloride and to a process for its production.

We have previously developed a method for preparing a rubber hydrochloride in which rubber is treated with dry liquefied hydrogen chloride or with hydrogen chloride under pressure. We have now found that this rubber derivative is of a stable character and may be satisfactorily formed into thin, flexible, transparent sheets by dissolving the rubber hydrochloride in a suitable low boiling solvent and casting the solution on a suitable forming surface. After evaporation of the solvent, the dried material may then be stripped from the forming surface as a thin, flexible, transparent, self-sustaining sheet, particularly adapted for wrapping purposes because of its flexibility and stability toward atmosphere, temperature, and humidity conditions.

It has been previously proposed to form transparent sheets out of a rubber hydrochloride made by dissolving rubber in chloroform and saturating the solution with hydrogen chloride. The use of this material has not resulted in a sheet having the necessary transparency, flexibility and strength to serve as a wrapping material, or for the other purposes for which such transparent sheets are used. A rubber hydrochloride sheet having these qualities can be obtained by the use of a rubber hydrochloride produced in the absence of a solvent, in accord with the new process mentioned above.

It is, therefore, an object of this invention to provide, transparent, flexible, self-sustaining sheets of rubber hydrochloride.

It is a further object of this invention to provide a process for making said sheet material by casting from a solution of rubber hydrochloride.

Other and further objects of this invention will be evident from the following specification and the accompanying claims.

In our copending application Serial No. 703,866, entitled "Reaction products of butadiene derivatives with hydrozen halides and the method of producing the same," we have described a rapid and cheap method admirably adapted for continuous operation for producing a new type of hydrogen halides of rubber, balata, gutta percha and related substances. In the case of the hydrochlorides, this is accomplished by subjecting the rubber to the action of liquefied hydrogen chloride or of dry hydrogen chloride gas under greater than atmospheric pressure. When liquefied hydrogen chloride is used, this reaction is very rapid and the product is a stable one. For example, if the rubber is in thin sheets, or some other form which is adapted to react readily, the reaction will in many cases go to completion in a few seconds.

In the preferred embodiment of our invention rubber and hydrogen chloride are used. Any unvulcanized rubber, either milled or unmilled is suitable, although pale crepe is preferred to smoked rubber, since the final product using pale crepe will be lighter in color. The rubber should be first made into thin sheets or some other form in which all parts of the material are readily accessible to the hydrogen chloride with which it is to react. Other forms of rubber, such as powdered rubber, will also react satisfactorily.

Milling the rubber has the effect of increasing the plasticity of the finished sheet material. In other words, a harder sheet is produced when unmilled rubber is used. The use of milled rubber has the additional advantage that the resulting rubber hydrochloride is more readily soluble in the solvents used in preparing the sheet material than when unmilled rubber is employed. Pale crepe rubber milled to a Williams plasticity of 210 and dead milled rubber having a Williams plasticity of 120 have been successfully used in this process. By "dead" milled rubber is meant rubber which has been milled until further milling will produce no further change.

The rubber in suitable form may be brought into contact with liquefied hydrogen chloride at —85° C. for a short time, for example, one minute or less. During this time, the reaction is completed and the rubber is converted into a material which, upon evaporation of the excess hydrogen chloride, has a spongy, asbestos-like structure, almost white in appearance. This product is a permanently amorphous and asymmetrical rubber hydrochloride. It is non-jelling and more soluble than other rubber hydrochlorides which have been produced. The product readily dissolves in cold benzol and forms solutions in concentration of 8% which do not jell.

Transparent sheets produced from this product have entirely different properties from sheets made from previously known rubber hydrochlorides. They are harder and more paper-like, and lack the tendency to stretch, characteristic of the original rubber and which has never been eliminated from previous rubber hydrochloride sheets.

When thick sheets of rubber are used, a longer period will be required to complete the reaction. For example, if the sheets have a thickness of .020–.040 inch, as much as five minutes may be required, while one minute or less will be sufficient for a sheet having a thickness of .015 inch.

When the reaction is complete, this product contains about 28% to 30% of chlorine.

When the process is carried out as above disclosed, no separate step of drying or purifying the product is necessary. It is, however, advisable to keep the product dry. Any residual free hydrogen chloride in the solid rubber hydrochloride will dissipate itself very quickly, leaving no residue. If desired, the excess hydrogen chloride remaining in the sheet after the reaction is complete may be removed by suitable means, such as a vacuum or increased temperature, or a combination of the two, and collected for use in treating a further quantity of the material. No undesirable impurities are thus introduced or formed during the reaction.

It will be understood that the reaction may be stopped at any desired point by removing the rubber or other material from the hydrogen chloride before the reaction is complete. The product resulting from this procedure will be only partly reacted.

The first step in the present process for producing sheet material comprises the dissolving of the rubber hydro-chloride, prepared in accordance with the above described process, in an organic solvent. For this purpose a large number of solvents are usable, such as carbon tetrachloride, benzene and its homologues, or ethylene dichloride. Of these, benzene is to be preferred because at the present time it is cheaper than any of the others. However, such materials as carbon tetrachloride and ethylene dichloride have the great advantage that they are non-inflammable, or burn with difficulty and thereby reduce the fire hazard.

From 3 to 10% of the rubber hydrochloride may be dissolved in one of the above solvents, although a range of from 4 to 8% will be found to be preferable. The upper limit will in many cases be determined by the solubility of the rubber hydrochloride. This solubility in turn depends upon the extent of the milling of the rubber before it was subjected to the section of the hydrogen chloride. A well milled rubber will produce a hydrochloride which will be soluble in any of the above solvents to the extent of at least 10%.

While it is possible to produce a thin, transparent sheet from a solution as described above, containing rubber hydrochloride alone, it is preferable to add certain other materials which act as plasticizers, homogenizers or bonding agents. Any such material which is compatible with rubber hydrochloride in solution and which is non-blooming may be employed. Among others, are the following:

Arochlors (chlorinated diphenyls)
Chlorinated diphenyl ethers
Chlorinated naphthalene These materials may be liquids or solids. The liquids and soft solids act as plasticizers; the hard solids as homogenizers. All act to increase the adhesive power of the rubber hydrochloride compositions.

When the above substances are liquids and tend to make the sheet tacky, they should be used only in amounts between 1½ and 3%, based upon the weight of rubber hydrochloride in the solution. However, where they do not produce a tacky sheet, they may be used in amounts up to 5% or even more. For example, the hard or highly chlorinated arochlors may be used in amounts up to 15 or 20% for self sustaining sheets, and up to about 80% for coating compositions and molded products.

Anti-oxidants may be added, if desired, to produce a sheet which will maintain its pliability and flexibility over a longer period of time. The anti-oxidants used for this purpose may be those commonly used in rubber products, although when a clear sheet is desired, care should be taken to employ only such anti-oxidants as will not become colored on oxidation. If rubber accelerators are used, as for example hexamethylene tetramine, it should be remembered that these often have antioxidant properties in which case antioxidants may be unnecessary.

The coating solution made up in accord with the above disclosure may be formed into sheets by means of the machine disclosed in Reissue Patent No. 17,854, issued to Edouard M. Kratz. In the operation of this machine, the solution described above is spread upon a continuous forming belt as a thin film and is dried thereon, after which it is removed and wound into rolls of convenient size.

For best results, the temperature of drying should not be allowed to exceed 90° C., and is preferably maintained between 60 and 80° C. When the drying is done at a very high temperature, there is a tendency for the rubber hydrochloride to decompose.

The term rubber hydrochloride as used in the following claims is intended to designate a hydrogen chloride of rubber or of the characteristic chemical constituents of rubber, containing approximately 28% or more by weight of chlorine, such as may be produced by the reaction previously described between rubber and liquefied hydrogen chloride or dry gaseous hydrogen chloride under greater than atmospheric pressure.

The product of our invention is a self-sustaining sheet material having by itself excellent resistance to the penetration of moisture vapor. When prepared in thin, transparent sheets, because of its flexibility and pliability, together with its stability toward extremes of atmospheric conditions of temperature and humidity, our product is peculiarly adapted for general wrapping purposes.

The sheets produced from rubber hydrochloride made in the absence of a solvent are much clearer, harder, and more rigid than those made from the rubber hydrochlorides formerly known. Particularly the tendency to stretch, so characteristic of the rubber, is much more completely eliminated in sheets made by the present process. This may be due to the fact that when the hydrochloride is made in a solvent, the proteins, resins, etc., contained in the rubber become separated and are not made an integral part of the finished sheet material, as is believed to be the case in the present invention.

It is also very likely that the molecules of rubber are broken down more when in a solvent or that the hydrogen chloride is able to attack them more advantageously so that the final product contains shorter chains of molecules than when the reaction takes place with the rubber in solid form. However, it is not intended that the invention shall be limited by any particular theory of operation, the above theory being merely suggestive of the difference between the reactions without and in a solution.

We are aware that numerous details of the process may be varied through a wide range without departing from the principles of this invention and we, therefore, do not purpose limiting the patent granted hereon otherwise than necessitated by the prior art.

These rubber hydrochlorides, which may be made up into transparent sheet material as described above, may also be used to produce moisture resistant rubber hydrochloride coatings for sheet material or various other objects.

Various resins, gums, waxes and the like have been found to be satisfactory. These include the arochlors (chlorinated diphenyls), paraffin, chlorinated paraffin, polycoumarone, rosin and dammar gum. Various antioxidents may also be added to preserve the rubber if desired.

The following formula of a satisfactory coating composition is not to be construed as a limitation on the invention since the proportions are not critical, but is to be understood as giving desirable proportions which have been found to be operative:

*Example*

|  | Percentage by weight |
|---|---|
| Rubber hydrochloride | 30 to 75 |
| Chlorinated diphenyl | 70 to 25 |

We claim:

1. A composition of matter comprising a rubber hydrohalide and a substance from the group consisting of chlorinated diphenyl, chlorinated diphenyl ether and chlorinated naphthalene.

2. A composition of matter comprising a rubber hydrochloride and a chlorinated diphenyl.

3. A coating composition comprising a rubbre hydrochloride, a chlorinated diphenyl, and a solvent.

4. A coating composition comprising an amorphous rubber hydrochloride, a chlorinated diphenyl and a volatile organic solvent.

5. A sheet of film comprising a rubber hydrochloride and a chlorinated diphenyl.

6. In combination, a surface and a film containing rubber hydrochloride and a chlorinated diphenyl.

7. A composition of matter comprising a rubber hydrochloride and a chlorinated naphthalene.

8. A composition of matter comprising a rubber hydrochloride and a chlorinated diphenyl ether.

9. A coating composition comprising a rubber hydrochloride, a chlorinated naphthalene, and a solvent.

10. A coating composition comprising a rubber hydrochloride, a chlorinated diphenyl ether, and a solvent.

11. A coating composition comprising a rubber hydrochloride, a chlorinated naphthalene and a volatile organic solvent.

12. A coating composition comprising a rubber hydrochloride, a chlorinated diphenyl ether and a volatile organic solvent.

13. A sheet or film comprising a rubber hydrochloride and a chlorinated naphthalene.

14. A sheet or film comprising a rubber hydrochloride and a chlorinated diphenyl ether.

15. In combination, a surface and a film containing rubber hydrochloride and a chlorinated naphthalene.

16. In combination, a surface and a film containing rubber hydrochloride and a chlorinated diphenyl ether.

MARIE GEBAUER-FUELNEGG,
*Administratrix of the Estate of Erich Gebauer-Fuelnegg, Deceased.*

EUGENE W. MOFFETT.